US006671954B2

(12) United States Patent
Nomoto

(10) Patent No.: US 6,671,954 B2
(45) Date of Patent: Jan. 6, 2004

(54) RUBBER PLUG INSERTION APPARATUS AND RUBBER PLUG INSERTION METHOD

(75) Inventor: Yoshiaki Nomoto, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 362 days.

(21) Appl. No.: 09/816,215

(22) Filed: Mar. 26, 2001

(65) Prior Publication Data

US 2002/0133945 A1 Sep. 26, 2002

(51) Int. Cl.[7] .......................... B23P 19/04; B23P 11/02

(52) U.S. Cl. ............................ 29/881; 29/433; 29/450; 29/464; 29/468; 29/241

(58) Field of Search .......................... 29/881, 882, 443, 29/450, 464, 468, 241

(56) References Cited

U.S. PATENT DOCUMENTS 4,653,182 A * 3/1987 Fukuda et al. ................ 29/754
5,007,164 A * 4/1991 Kato .......................... 29/854
5,351,385 A * 10/1994 Takano ........................ 29/450
5,743,002 A * 4/1998 Ito et al. ....................... 29/754
6,134,769 A * 10/2000 Takano et al. ................ 29/450
6,401,331 B1 * 6/2002 Mizuno ....................... 29/771

* cited by examiner

*Primary Examiner*—Timothy V. Eley
(74) *Attorney, Agent, or Firm*—Finnegan, Henderson, Farabow, Garrett & Dunner, L.L.P.

(57) ABSTRACT

The rubber plug insertion apparatus 10 is provided with upper and lower rubber plug holders 36, 37 holding a rubber plug 14 which is to be mounted on the end of an electric wire 67, and upper and lower insertion guides 38, 39 for guiding the end of the electric wire 67, at the time of inserting the end of the electric wire 67 into a barrel hole 14A in the rubber plug 14 arranged in the upper and lower rubber plug holders 36, 37, By arranging the upper and lower insertion guides 38, 39 on the side opposite to one side where the end of the electric wire 67 is inserted into the upper and lower rubber plug holders 36, 37, a rubber plug insertion apparatus can be realized, wherein an electric wire can be reliably inserted into the rubber plug and defective insertion hardly occurs.

3 Claims, 12 Drawing Sheets

RUBBER PLUG INSERTION APPARATUS AND RUBBER PLUG INSERTION METHOD

BACKGROUND OF THE INVENTION

1. Field of the Invention

The present invention relates to a rubber plug insertion apparatus for and a rubber plug insertion method of mounting a rubber plug onto an end of an electric wire.

2. Description of the Related Art

As a rubber plug insertion apparatus for inserting an end of an electric wire into a rubber plug, there has been proposed one (not prior art) comprising: a rubber plug supply section for aligning and supplying rubber plugs; a rubber plug delivery section for receiving rubber plugs from the rubber plug supply section and delivering these at a predetermined timing; and a rubber plug mounting section for sequentially mounting the rubber plugs supplied from the rubber plug delivery section onto the end of the electric wire. The rubber plug supply section has a function for aligning and sequentially supplying the rubber plugs to the rubber plug receiving apparatus side. The rubber plug delivery section has a function for delivering the rubber plugs supplied from the rubber plug supply section to the rubber plug mounting section.

As shown in FIGS. 1A, 1B and 1C, the rubber plug mounting section 1 clamps a rubber plug 2 between a pair of rubber plug holders 3, 4 arranged so as to face each other. Also, the rubber plug mounting section 1 makes the rubber plug 2 approach to the end of an electric wire 6 held by an electric wire holding means 5, and mounts the rubber plug onto the end of the electric wire. Housing recess portions 3A, 4A are respectively formed for housing the rubber plug 2, on the opposite side of these rubber plug holders 3, 4. Moreover, the rubber plug mounting section 1 has a pair of insertion guides 7, 8 at a position towards the electric wire holding means 5 from the rubber plug holder 3, 4. The insertion guides 7, 8 are provided with insertion pipe portions 7A, 8A protruding towards the rubber plug holders 3, 4, in such a shape that a pipe is divided into half along the central axis. As shown in FIG. 1A, it is set such that these insertion pipe portions 7A and 8A are joined together to form a cylinder. Also the insertion guides 7, 8 are provided relatively movable with respect to the rubber plug holders 3, 4, for inserting the insertion pipe portions 7A, 8A toward the barrel hole in the rubber plug 2 clamped between the rubber plug holders 3, 4. The cylinder formed by joining the insertion pipe portions 7A, 8A ensures a space for inserting and guiding the end of the electric wire 6 within the rubber plug 2.

Based on the above construction, as shown in FIG. 1A, the insertion pipe portions 7A, 8A of the insertion guides 7, 8 joined together are inserted into the barrel hole in the rubber plug 2 held by the rubber plug holders 3, 4 from the electric wire holding means 5 side. From this state, the united rubber plug 2, rubber plug holders 3, 4 and insertion guides 7, 8 are moved in parallel to the axial direction of the end of the electric wire 6 toward the end of the electric wire 6 side. Thereafter as shown in FIG. 1B, the end of the electric wire 6 is passed through the insertion pipe portions 7A, 8A. From the state shown in FIG. 1B, the insertion pipe portions 7A, 8A of the insertion guides 7, 8 are pulled out towards the electric wire holding means 5 side, to thereby become the state shown in FIG, 1C. From the state shown in FIG. 1C, the insertion guides 7, 8 and the rubber plug holders 3, 4 are separated from each other in the vertical direction. In this manner, mounting the rubber plug 2 onto the end of the electric wire 6 is completed.

In the above-described rubber plug insertion apparatus that has been heretofore proposed, however, it is required to ensure a distance L1 for palling out the insertion guides 7, 8 between the electric wire holding means 5 and the rubber plug holders 3, 4, as shown in FIG. 1C. Therefore, there is a problem in that the length of the and of the electric wire 6 extending from the electric wire holding means 5 becomes long. If the length of the electric wire 6 extending from the electric wire holding means 5 increases, the weight of the electric wire cannot be supported due to the rigidity of the electric wire. Accordingly, in the state as shown in FIG. 1A, the end of the electric wire 6 is apt to be bent downward, causing a problem in that it becomes difficult to reliably introduce and guide the end of the electric wire 6 to the insertion guides 7, 8.

SUMMARY OF THE INVENTION

It is an object of the present invention to provide a rubber plug insertion apparatus for and a rubber plug insertion method of mounting a rubber plug onto an end of an electric wire, wherein an electric wire can be reliably inserted into the rubber plug and defective insertion hardly occurs.

The first aspect of the invention provides a rubber plug insertion apparatus comprising: a rubber plug holder by which a rubber plug to be mounted on the end of the electric wire is held; and an insertion guide for guiding the end of the electric wire into an electric wire penetrating hole in the rubber plug in the rubber plug holder, at the time of insertion of the tend of the electric wire, wherein the insertion guide is arranged on the side opposite to one side where the end of the electric wire is inserted into the rubber plug holder.

According to the first aspect of the invention, since the insertion guide is arranged on the side of the rubber plug holder opposite to the insertion side of the end of the electric wire, the electric wire holding position can be set in the vicinity of that end. That is to say, the extension length of the electric wire from the holding position to the point of the end of the electric wire can be made short. Accordingly, bending of the end of the electric wire is unlikely to occur, and hence the end of the electric wire can be reliably inserted into the electric wire penetrating hole in the rubber plug. As a result, a rubber plug insertion apparatus that hardly produces defective goods can be realized.

The second aspect of the invention provides a rubber plug insertion apparatus according to the first aspect of the invention, wherein the rubber plug bolder comprises: a holding groove for holding a holder body and the rubber plug; an opening for inserting the end of the electric wire, provided continuously on one side or the holding groove, so as to expand gradually towards the insertion side of the end of the electric wire; and an opening on the insertion guide side provided on the other side of the holding groove, into which the insertion guide is inserted, and the insertion guide comprises: a guide body; and a guide barrel provided in a protruding condition from the guide body, inserted from the opening on the insertion guide, side and inserted into the electric wire penetrating bole in the rubber plug in the holding groove.

According to the second aspect of the invention, the end of the electric wire can be reliably guided to the electric wire penetrating hole in the rubber plug, by means of the opening for inserting the end of the electric wire formed on the rubber plug holder so its to expand gradually towards the insertion side. Moreover, by inserting the guide barrel of the insertion guide from the opening on the insertion guide, side of the rubber plug holder, it can be prevented that insertion of the end of the electric wire into the electric wire penetrating hole becomes difficult, due to reasons, for example, the electric wire penetrating hole in the rubber plug is collapsed, or the like.

The third aspect of the invention provides a rubber plug insertion method of inserting the end of the electric wire held by the electric wire holding section into a rubber plug in the state protruding from the electric wire holding section by a predetermined dimension, the method comprising the steps of; housing and holding the rubber plug by putting the rubber plug between upper and lower rubber plug holders arranged in proximity to the end of the electric wire; inserting an insertion guide into the rubber plug holder from the opposite side of the end of the electric wire; inserting a guide barrel of the insertion guide into the electric wire penetrating hole in the rubber plug in the rubber plug holder; moving the rubber plug holder and the guide barrel in this state toward the end of the electric wire; inserting the end of the electric wire into the electric wire penetrating hole in the rubber plug in the rubber plug holder; removing the rubber plug holder from the rubber plug, by pulling out the guide barrel of the insertion guide from the electric wire penetrating hole in the rubber plug toward the side opposite to one side where the end of the electric wire is inserted; and taking out the end of the electric wire mounted with the rubber plug.

According to the third aspect of the invention, since the insertion guide is arranged on the side of the rubber plug holder opposite to the insertion side of the end of the electric wire, the holding position of the electric wire can be set in the vicinity of that end. That is to say, the side for pulling out the guide barrel of the insertion guide from the rubber plug holder is the opposite side to the insertion side of the end of the electric wire. Therefore, even if the vicinity of the end of the electric wire is held, it does not interrupt the operation of pulling out the insertion guide from the rubber plug. As a result, the extension length of the electric wire from the holding position to the point of the end of the electric wire can be set short, thereby bending of the end of the electric wire is unlikely to occur, and hence the end of the electric wire can be reliably inserted into the electric wire penetrating hole in the rubber plug. Accordingly, a rubber plug insertion method that hardly causes defective insertion can be realized. Moreover, by inserting the guide barrel of the insertion guide from the side opposite to the end of the electric wire, it can be prevented that insertion of the end of the electric wire into the electric wire penetrating hole becomes difficult, due to reasons, for example, the electric wire penetrating hole in the rubber plug is collapsed, or the like.

Figure 13:
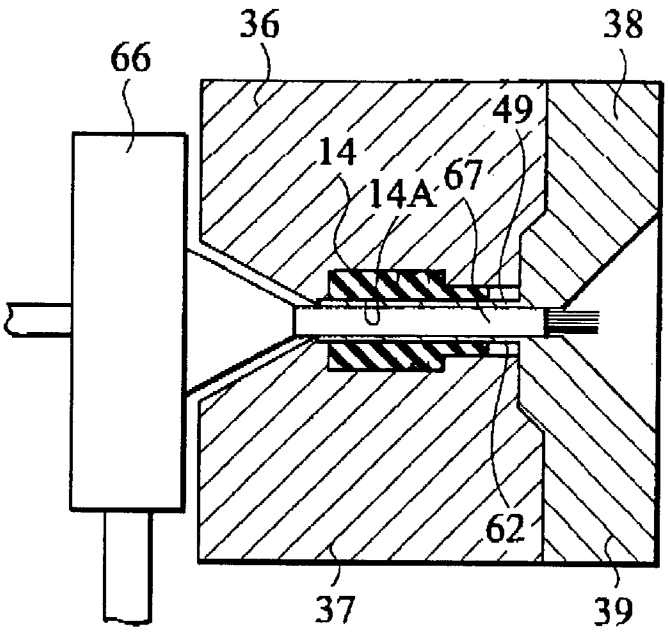
FIG. 13 is a partial sectional view showing the next step of FIG. 12 in this embodiment.

FIG, 14 is a partial sectional view showing the next step of FIG. 13 in this embodiment.

Figure 14:
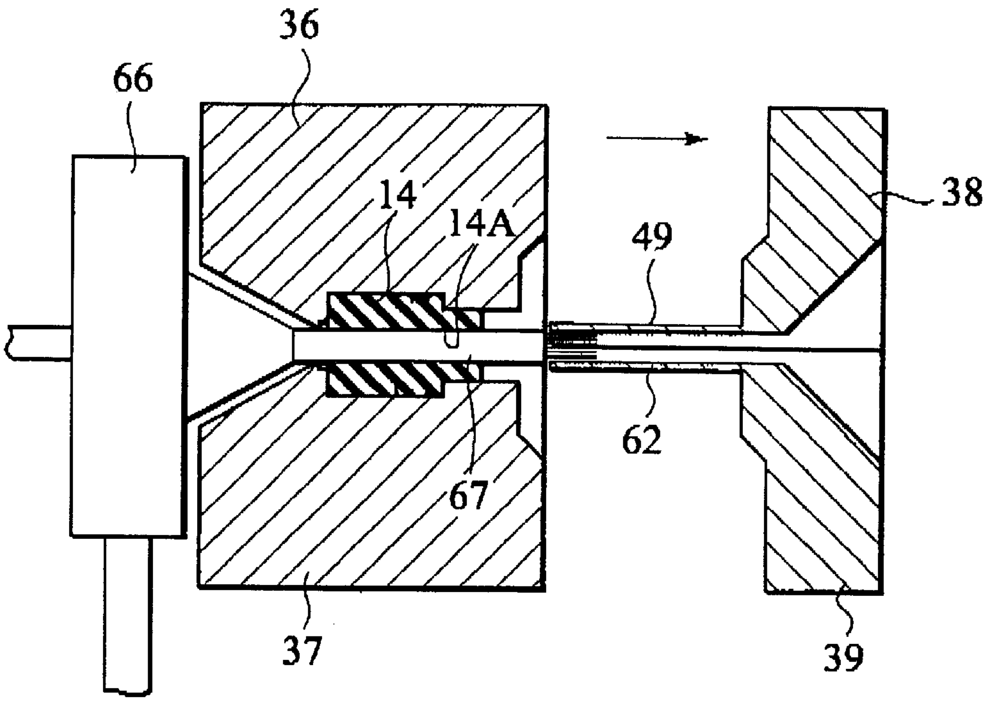
Figure 15:
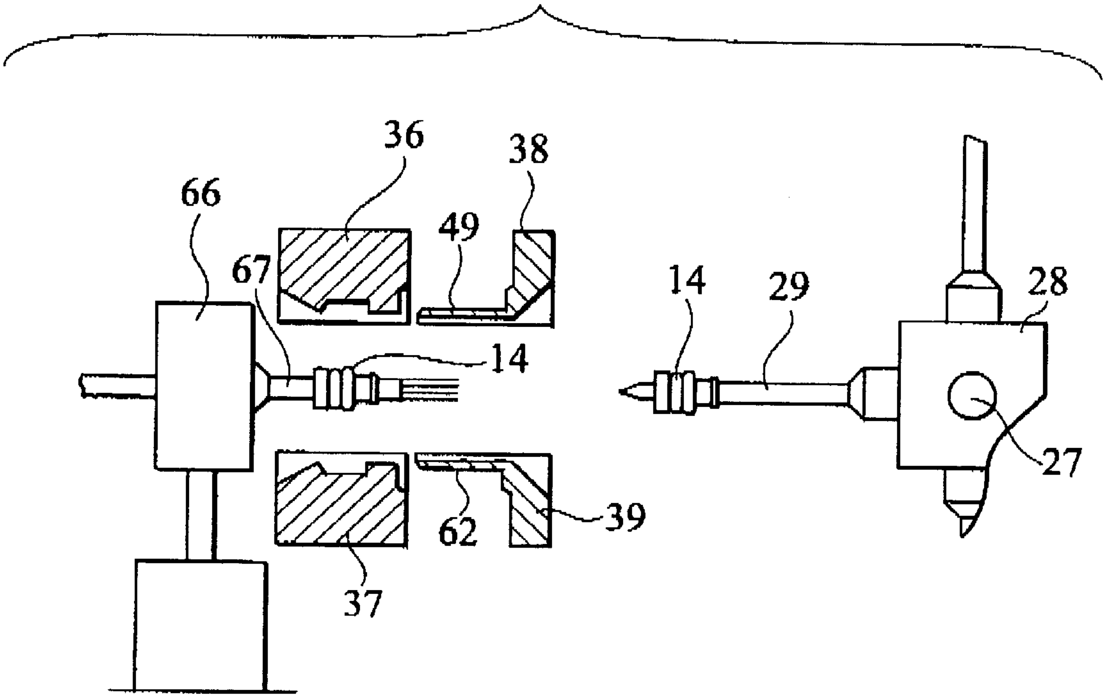

FIG. 15 is a partial sectional view showing the next step of FIG. 14 in this embodiment and also showing the state that mounting of the rubber plug 14 on the end of the electric wire 67 has been completed.

DETAILED DESCRIPTION OF THE PREFERRED EMBODIMENTS

Figure 1A:
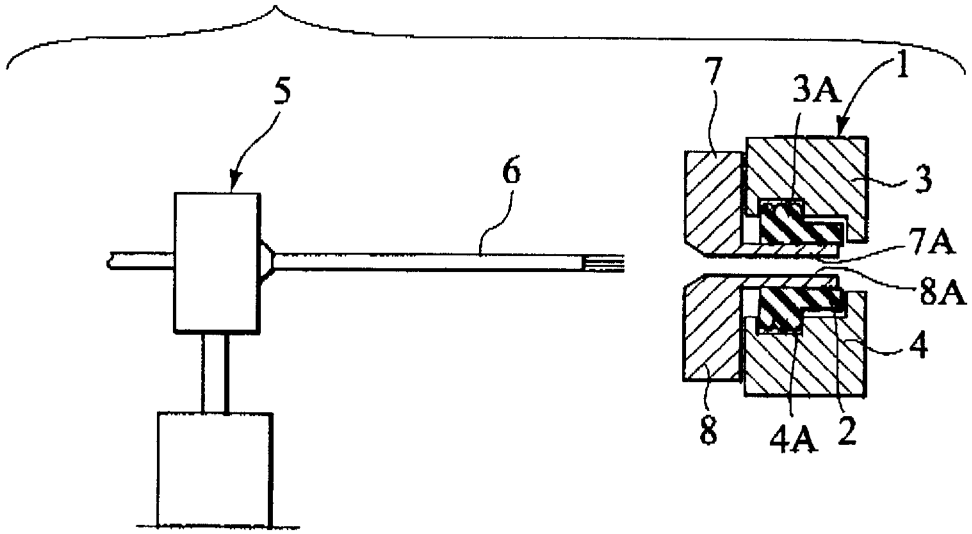
FIGS. 1A, 1B and 1C are partial sectional views for explaining the operation of a rubber plug mounting section 1 in a rubber plug insertion apparatus proposed heretofore.
Figure 1B:
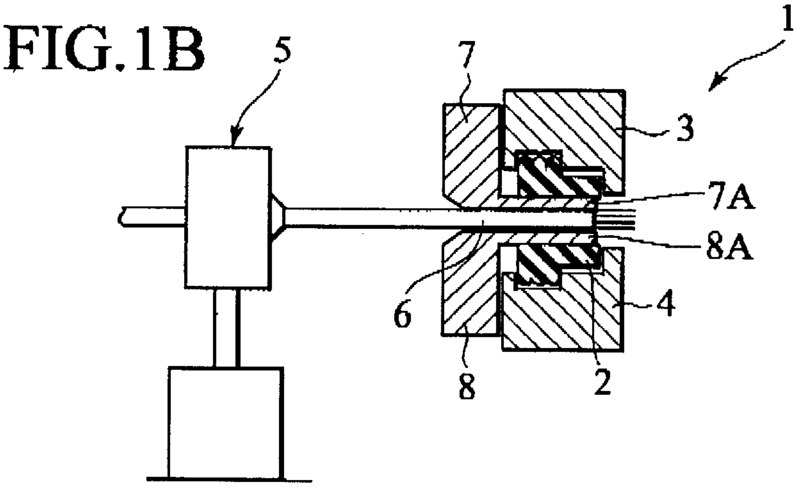
Figure 1C:
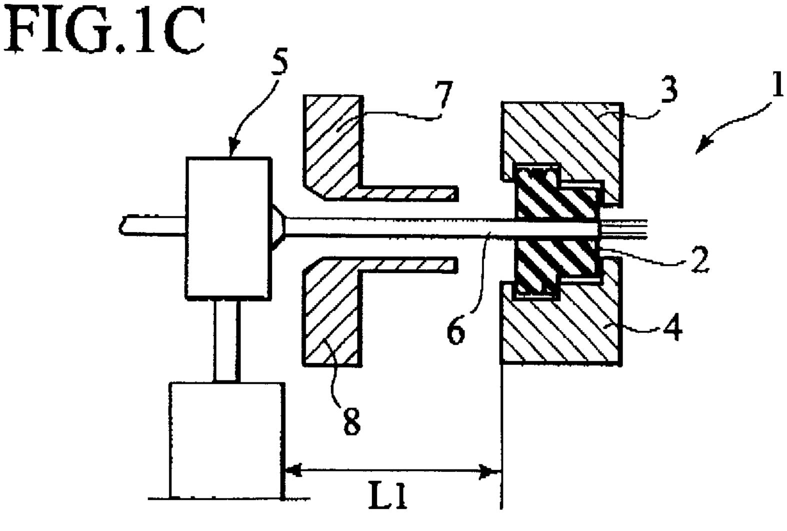
Figure 2:
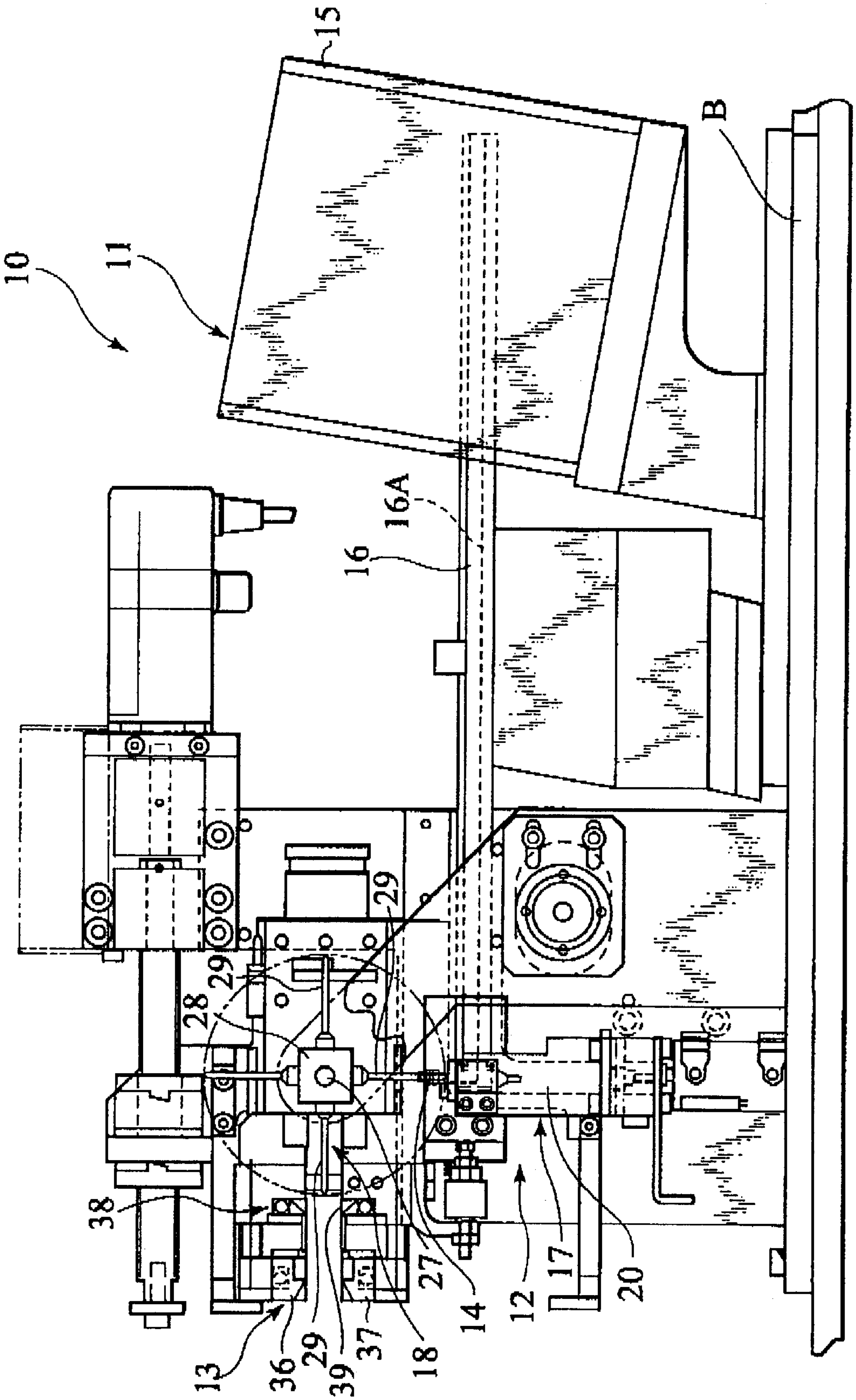
FIG. 2 is a front elevational view showing an embodiment of a rubber plug insertion apparatus 10 according to the present invention.

Hereinafter, details of a rubber plug insertion apparatus according to the present invention will be described, based on one embodiment shown in these figures. As shown in FIG. 2, a rubber plug insertion apparatus 10 is provided with a rubber plug supply section 11, a rubber plug delivery section 12 and a rubber plug mounting section 13, on a base B.

The rubber plug supply section 11 comprises a housing drum 15 for housing a plurality of rubber plugs 14, and an alignment feeder 16 for aligning the rubber plugs 14 supplied 1from the housing drum 15 in a row and sending these off towards the rubber plug delivery section 12. With the rubber plug supply section 11, the housing drum 15 performs rotary motion, thereby rubber plugs 14 in the housing drum 15 fall into an alignment groove 16A of The alignment feeder 16, and are sequentially pushed out towards the rubber plug delivery section 12.

The rubber plug delivery section 12 comprises a rubber plug extruding section 17 arranged at the end portion of the alignment feeder 16 (end portion located on the downstream side in the flow of the rubber plugs 14), and a rotary transfer section 18 arranged above the rubber plug extruding section 17.

Figure 5A:
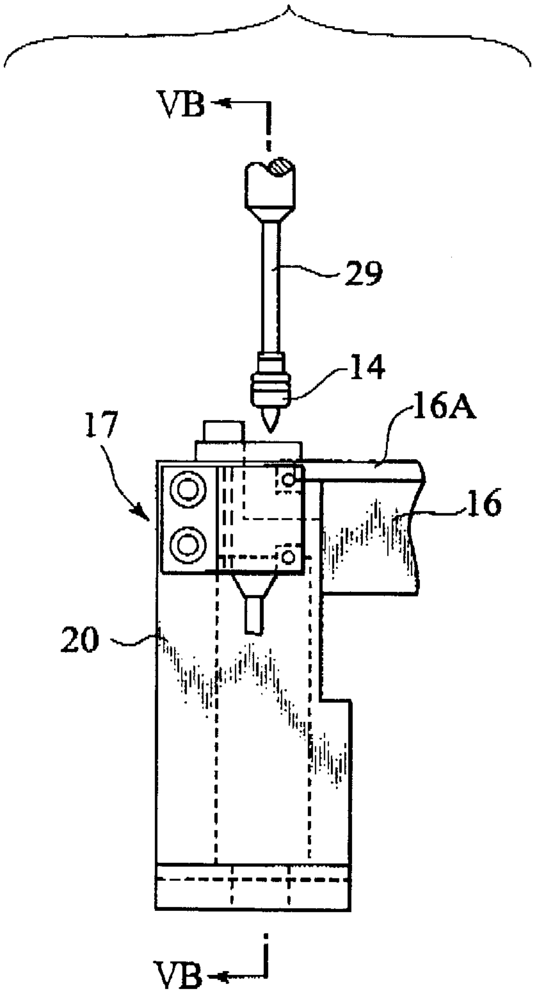
FIG. 5A is a front elevational view of the main part showing a rubber plug extrusion section 17 in this embodiment.
Figure 5B:
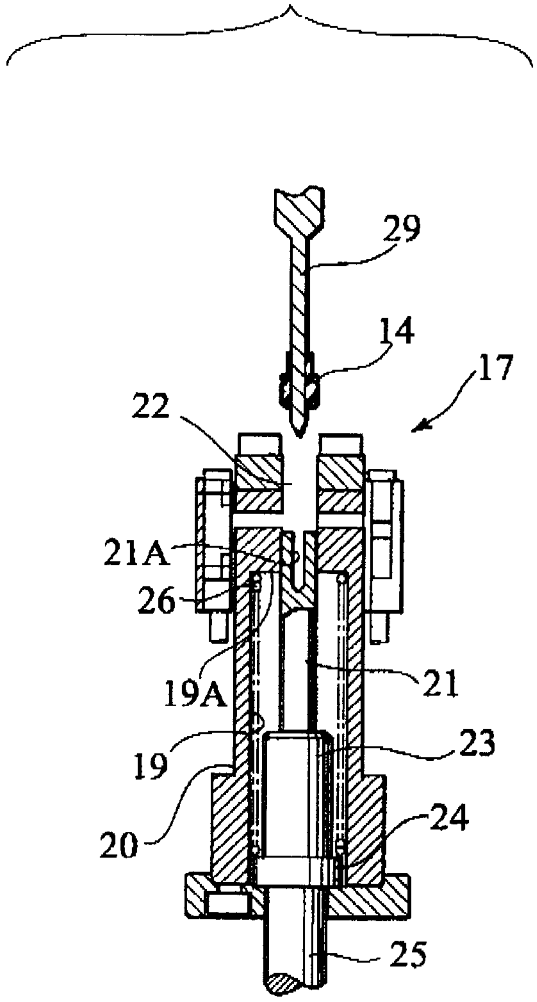
FIG. 5B is a sectional view along the line A—A in FIG. 5A.
Figure 6A:
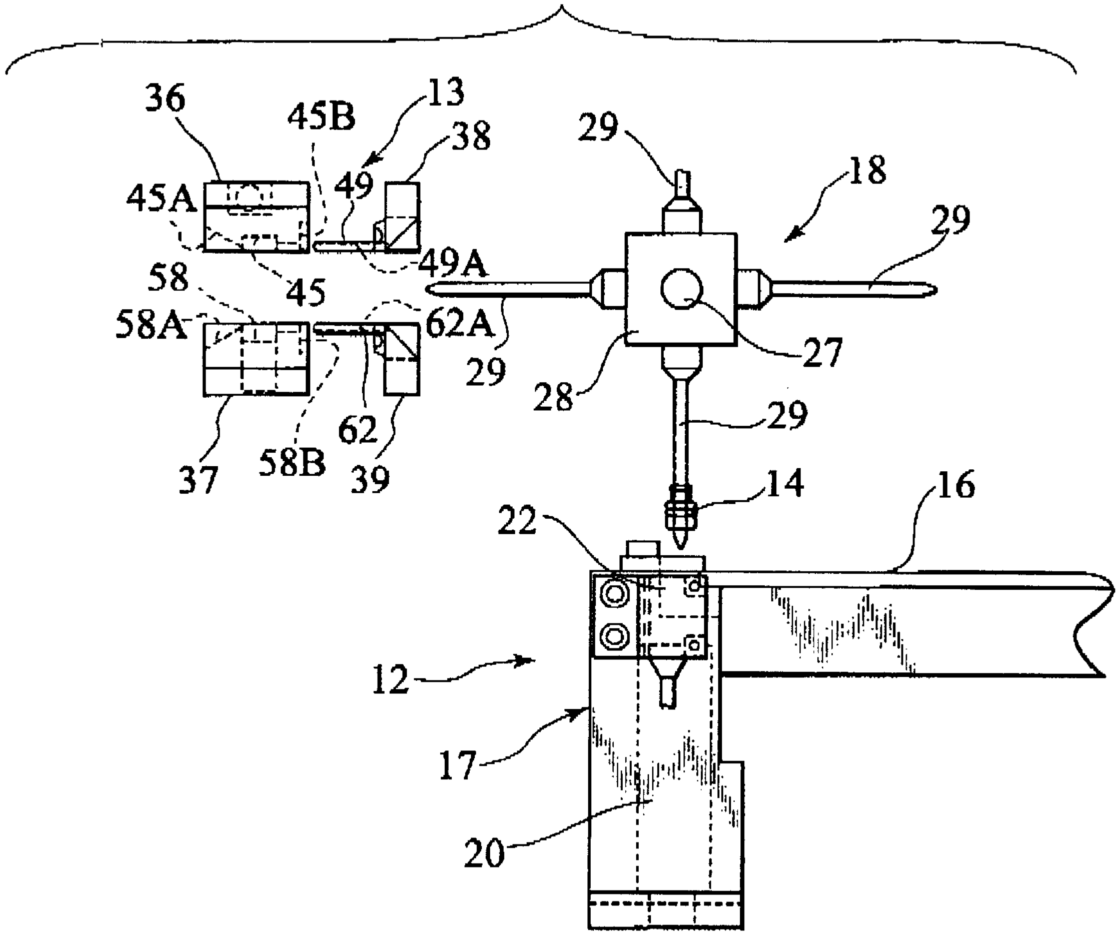
FIG. 6A is a front elevational view showing a positional relation between the rubber plug delivery section 12 and the rubber plug mounting section 13 in the rubber plug insertion apparatus in this embodiment.
Figure 6B:
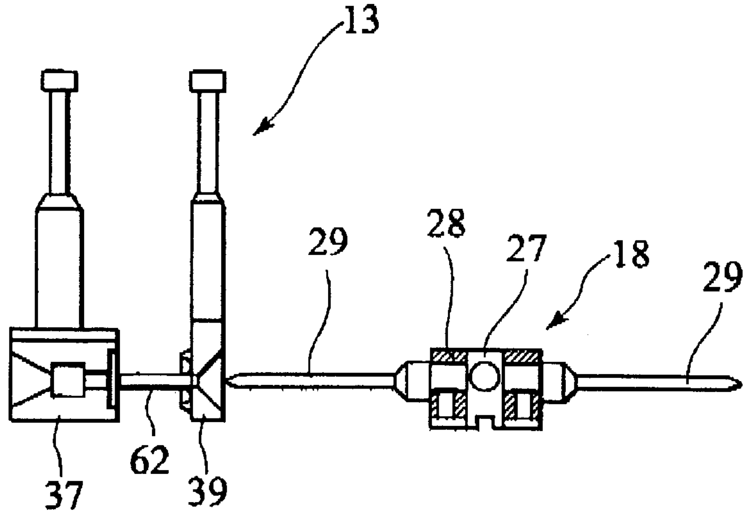
FIG. 6B is a plan view showing a positional relation between the rubber plug delivery section 12 and the rubber plug mounting section 13 in the rubber plug insertion apparatus In this embodiment.

The construction of the rubber plug extruding section 17 will be described, with reference to FIGS. 5A and 5B. The rubber plug extruding section 17 has, as shown in FIG. 5B, an escape base 20 in which a vertically penetrating pin insertion space 19 is formed, an escape pin 21 fitted together by insertion into the pin insertion space 19 so as to be able to move up and down, and a rubber plug standby section 22 formed above the pin insertion space 19.

The rubber plug standby section 22 is a gap linked with the alignment groove 16A of the alignment feeder 16, and the rubber plug 14 having reached the rubber plug standby section 22 is extruded toward the rotary transfer section 18 by the above-described escape pin 21. At the upper point of the escape pin 21, there is formed a transferred pin penetrating recess portion 21A, as shown in FIG. 5B.

Below the escape pin 21, there is integrally formed a thick diameter portion 23 which goes up and down in the pin insertion space 19 and regulates a stroke going up and down of the escape pin 21. Below the thick diameter portion 23, there is integrally formed a flange portion 24 having a thicker diameter than the thick diameter portion 23, which goes up and down in the pin insertion space 19 together with the thick diameter portion 23.

A piston rod 25 extending downward is integrally formed below the flange portion 24. The lower part of the piston rod 25 is introduced into a jig cylinder (not shown), and is driven up and down by the jig cylinder.

A coil spring 26 is compressed and arranged above the flange portion 24 so as to enclose the thick diameter portion 23 and the escape pin 21. The upper end of the coil spring 26 abuts against the upper end face 19A of the pin insertion space 19. Therefore, the flange portion 24 is energized downwards by the coil spring 26 at all times.

The construction of the rotary transfer section 18 constituting the rubber plug delivery section 12 together with the above-described rubber plug extruding section 26 will be described, with reference to FIGS. 2 to 4, and FIG. 6A and FIG. 6B. The rotary transfer section 18 comprises an rotation shaft 27 arranged above the rubber plug extruding section 17 and also along the horizontal direction, a rotary block 28 fixed to the rotation shaft 27, and four transfer pins 29 fixed so as to form a right angle with respect to each other around the rotary block 28.

Figure 4:
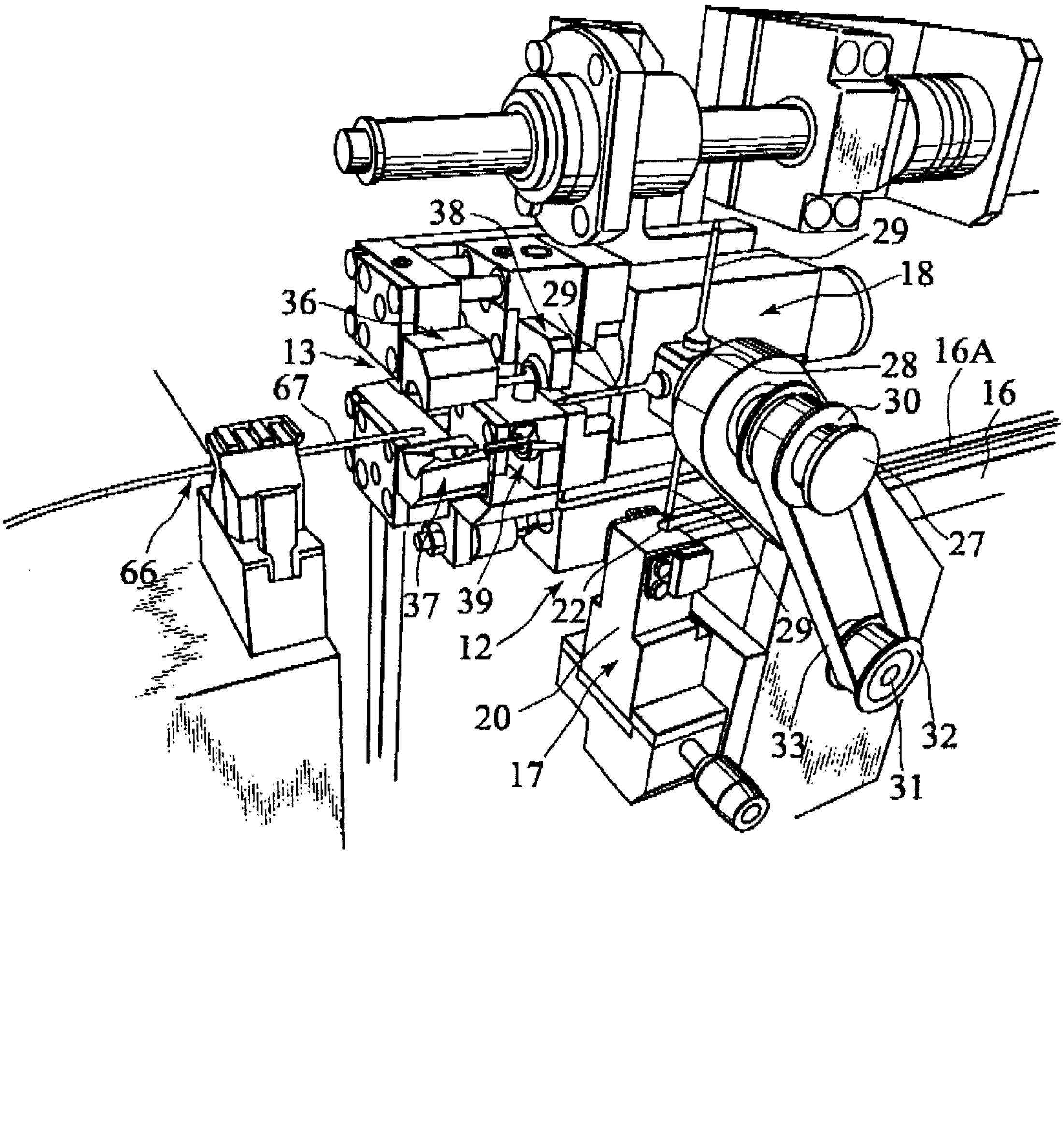
FIG. 4 is a perspective view showing a rubber plug delivery section 12 in this embodiment.

As shown in FIG. 4, a driven pulley 30 extended towards the side of the rubber plug insertion apparatus 10, to which a rotation drive force is transmitted from a drive pulley 32, is pivotally supported by the rotation shaft 27. Also below the rubber plug insertion apparatus 10, a drive shaft 31 is arranged in parallel to the rotation shaft 27, and the drive pulley 32 is pivotally supported by the drive shaft 31. An endless belt 33 is entrained over the driven pulley 30 and the drive pulley 32. Due to the rotation of the drive shaft 31, the rotation shaft 27 rotates every 90 degrees. The rotation timing of the rotation shaft 27 is regulated with the operation on the rubber plug mounting section 13 side described below. Moreover, the direction of the rotary motion of the transfer pin 29 is clockwise in FIG. 2, and the transfer pin 29 to which the rubber plug 14 is delivered from the rubber plug extruding section 17 supplies the rubber plug 14 toward the rubber plug mounting section 13 described below by means of the rotation through 90 degrees.

The construction of the rubber plug mounting section 13 will be described, with reference to FIGS. 2, 3, 6A, 6B, 7, 8A and 8B. The rubber plug mounting section 13 in the embodiment is disposed on the body side of the rubber plug insertion apparatus 10, and comprises: a pair of upper holder support block 34 and lower holder support block 35 that are able to move to a vertical direction and a horizontal direction; an upper rubber plug holder 36 and a lower rubber plug holder 37 respectively mounted and fixed to the upper and lower holder support blocks 34, 35; and an upper insertion guide 38 and a lower insertion guide 39.

Figure 7:
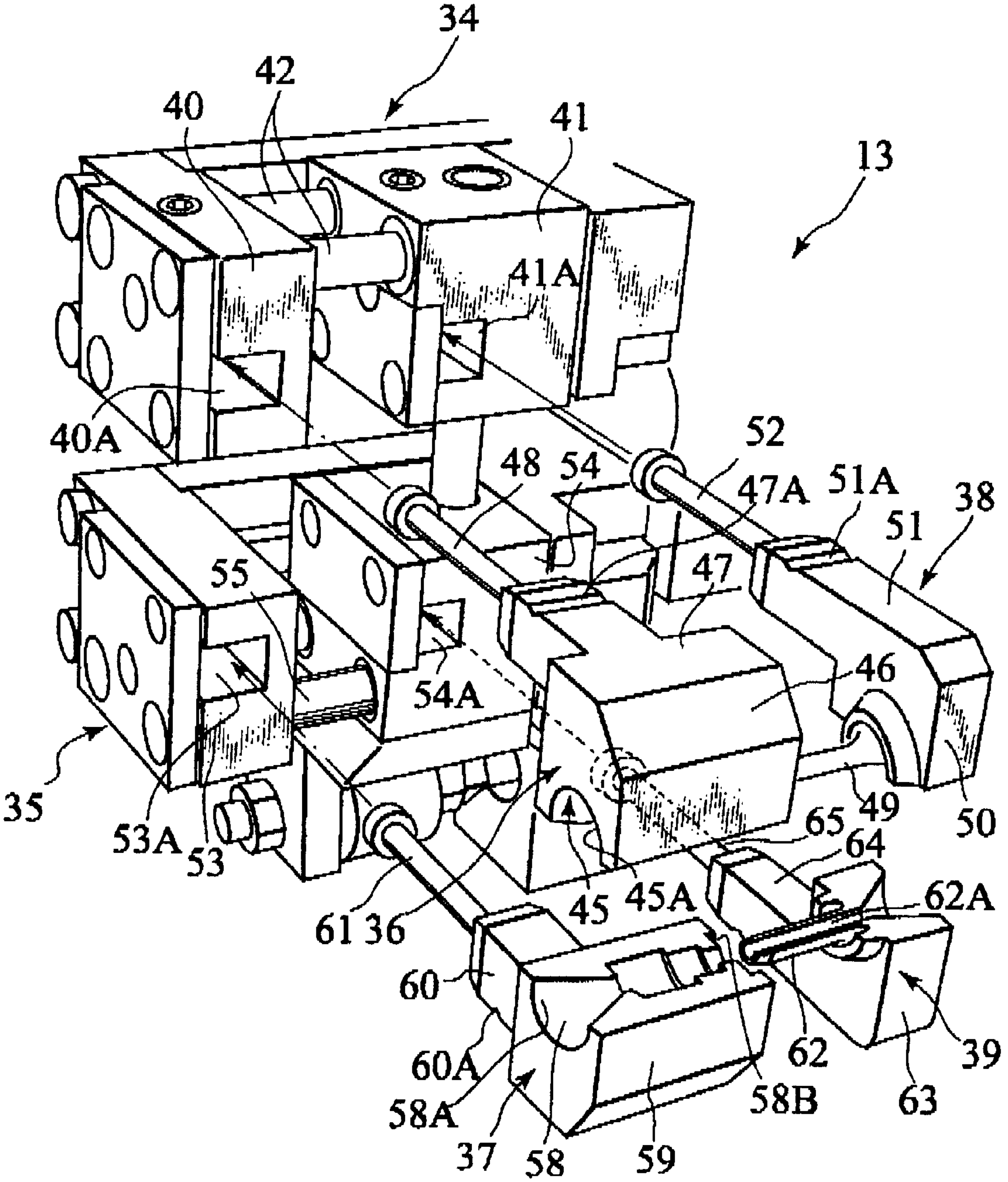
FIG. 7 is an exploded perspective view showing the rubber plug mounting section 13 in this embodiment.

The upper holder support block 34 comprises, as shown in FIG. 7, an upper fixed block section 40 to which the upper rubber plug holder 36 is set, and an upper movable block section 41 located on the rotary transfer section 18 side from the upper fixed block section 40.

A fitting hole 40A going through along the width direction of the apparatus is formed in the upper fixed block section 40. A fitting hole 41A going through in the same direction is also formed in the upper movable block section 41. Moreover, in the upper movable block section 41, there are provided guide rods 42, 42 so as to hang across between the upper fixed block section 40 and the opposite side of the upper holder support block 34 corresponding thereto, so that these can perform reciprocating motion by sliding in the vertical direction with respect to that opposite side. The upper movable block section 41 is driven so as to reciprocate at a predetermined timing along the guide rods 42, 42, by a drive means (not shown).

Figure 8A:
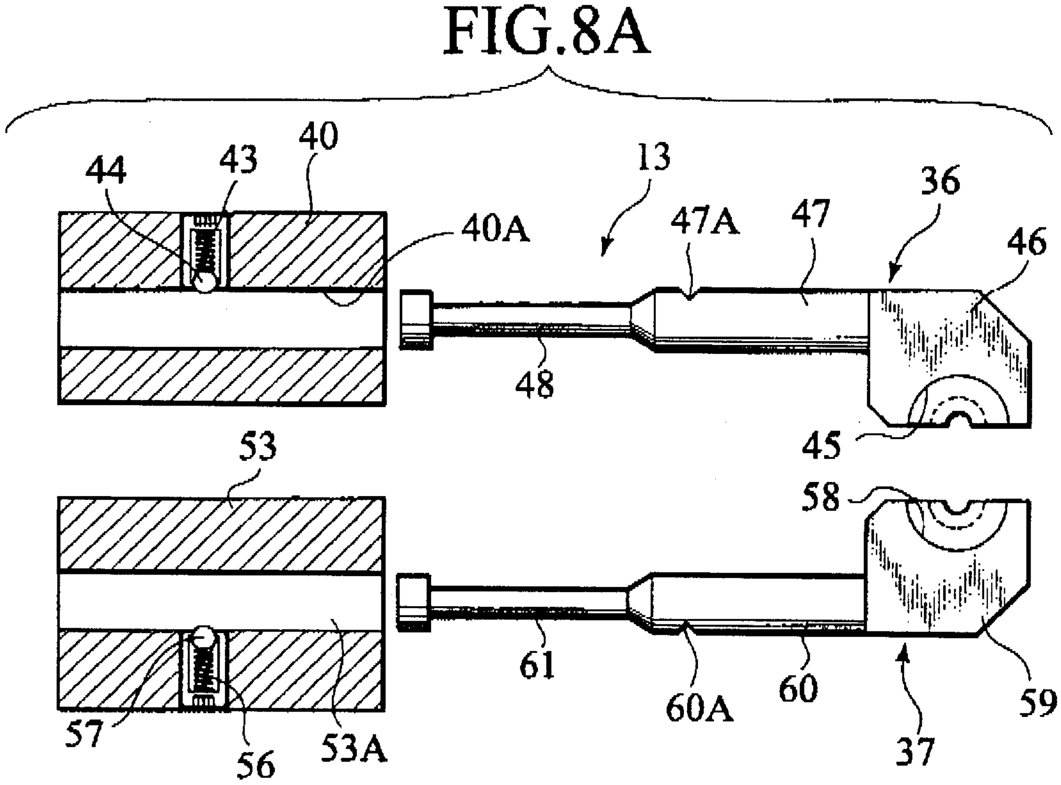
FIG. 8A is a partial sectional view showing a positional relation between upper and lower rubber plug holders 36, 37 and upper and lower fixed block sections 40, 53 in this embodiment.

As shown in FIG. 8A, a ball 44 is disposed on the inner wall of the fitting hole 40A so as to protrude toward the inside of the fitting hole 40A. The ball 44 is energized by a coil spring 43 as the energizing means, and regulated so as not to come out into the fitting hole 40A. That is to say, the coil spring 43 and the ball 44 form a ball plunger. Such a ball plunger is similarly provided also in the fitting bole 41A of the upper movable block section 41, though not shown.

The structure of the upper rubber plug holder 36 mounted on the fitting hole 40A of the upper fixed block section 40 will be described. The upper rubber plug holder 36 comprises: a rubber plug holding block 46 having a rubber plug housing recess portion 45 for housing the upper half (a half divided by a face passing through an rotation axis of the rubber plug 14) of the rubber plug 14, on the lower face thereof, an opening 45A for inserting the end of an electric wire gradually expanded outwards, which is the electric wire insertion side, for guiding the end of the electric wire, and an opening 45B on the insertion guide side formed on the surface facing the upper insertion guide 38; a fixed arm 47 integrally formed on the side of the rubber plug holding block 46; and an extrusion operation portion 48 integrally formed at the end of the fixed arm 47. The fixed arm 47 and the extrusion operation portion 48 are integrally formed so as to extend substantially linearly, and the total length combining these portions is set so as to be longer than the length of the fitting hole 40A. Also, at a predetermined position of the fixed arm 47, there is formed a V-shaped groove 47A with which the ball 44 engages.

Figure 8B:
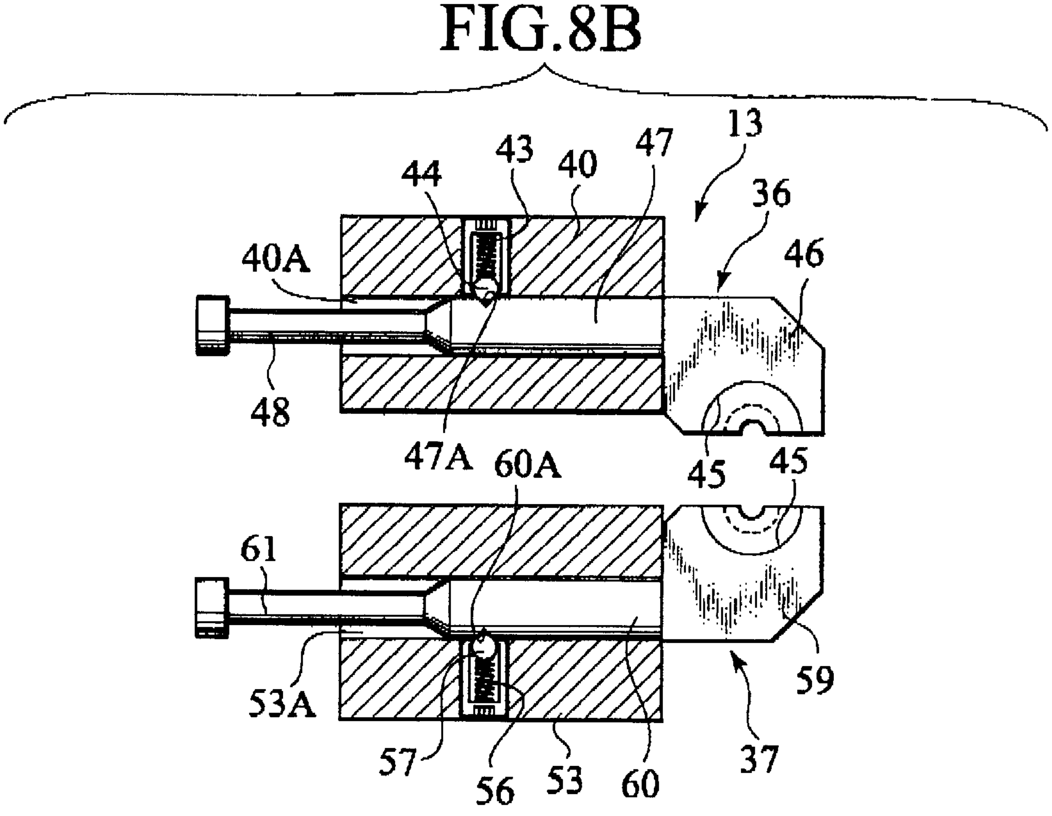
FIG. 8B is a partial sectional view showing the state that upper and lower rubber plug holders 36, 37 and the upper and lower fixed block sections 40, 53 in this embodiment are assembled.

In order to mount such an upper rubber plug holder 36 on the upper fixed block section 40, as shown in FIG. 8B, the extrusion operation portion 48 and the fixed arm 47 are fitted to the fitting hole 40A, so that the ball 44 is engaged with the V-shaped groove 47A formed in the fixed arm 47. At this time, the extrusion operation portion 48 is in the state protruding from the side opposite to the insertion side of the fitting hole 40A. Therefore, by pushing the head of the extrusion operation portion 48, the upper rubber plug holder 36 can be easily removed.

The upper insertion guide 38 comprises: as shown in FIG. 7, an insertion guide block 50 provided with a guide barrel 49 in an arc shape in section, in a protruding condition, having a groove 49A on the bottom face for ensuring the electric wire insertion path by being inserted into the barrel hole in the rubber plug 14; a fixed arm 51 integrally formed on the side of the insertion guide block 50; and an extrusion operation portion 52 integrally formed at the end of the fixed arm 51. Also, at a predetermined position of the fixed arm 51, there in formed a V-shaped groove 51A in the same manner as the upper rubber plug holder 36. Also in the upper insertion guide 38, when it is mounted in the fitting hole 41A of the upper movable block section 41, a ball (not shown) is engaged with the V-shaped groove 51A. Moreover, the extrusion operation portion 52 protrudes from the side opposite to the insertion side of the fitting hole 41A. Hence, at the time of replacing the upper insertion guide 38, it can be easily removed by pushing the extrusion operation portion 52. The upper holder support block 34 is set so as to allow movement of the extrusion operation portion 52 and expose the extrusion operation portion 52 so as to make it easy to push it.

The construction of the lower holder support block 35 side is the same as that of the upper holder support block 34. That is to say, the lower holder support block 35 comprises, as shown in FIG. 7, a lower fixed block section 53 for fitting the lower rubber plug holder 37, and a lower movable block section 54 located on the rotary transfer section is side from the lower fixed block section 53.

A fitting hole 53A going through along the apparatus width direction is formed in the lower fixed block section 53. A fitting hole 54A going through in the same direction is also formed in the lower movable block section 54. Moreover, in the lower movable block section 54, there are provided guide rods 55 so as to hang across between the lower fixed block section 54 and the opposite side of the lower holder support block 35 corresponding thereto, so that these can perform reciprocating motion by sliding in the vertical direction with respect to that opposite side. The lower movable block section 54 is driven so as to reciprocate at a predetermined timing along the guide rods 55, 55, by a drive means (not shown).

As shown in FIG. 8A, a ball 57 is disposed on the inner wall of the fitting hole 53A so as to protrude toward the inside of the fitting hole 53A. The ball 57 energized by a coil spring 56 is regulated so as not to come out into the fitting hole 53A, to thereby form a ball plunger. Such a ball plunger is similarly provided also in the fitting hole 54A of the lower movable block section 54, though not shown.

The lower rubber plug holder 37 mounted on the fitting hole 53A of the lower fixed block section 53 comprises: a rubber plug holding block 59 having a rubber plug housing recess portion 58 for housing the lower half of the rubber plug 14, on the upper face thereof, an opening 58A for inserting the end of an electric wire gradually expanded outwards, which is the electric wire insertion side, for guiding the end of the electric wire, and an opening 58B on the insertion guide side formed on the surface facing the insertion guide side; a fixed arm 60 integrally formed on the side of the rubber plug holding block 59; and an extrusion operation portion 61 integrally formed at the end of the fixed arm 60. The fixed arm 60 and the extrusion operation portion 61 are integrally formed so as to extend substantially linearly, and the total length combining these portions is set so as to be longer than the length of the fitting hole 53A. Also, at a predetermined position of the fixed arm 60, there is formed a V-shaped groove 60A with which the ball 44 engages. In order to mount such a lower rubber plug holder 37 on the lower fixed block section 53, as shown in FIG. 8B, the extrusion operation portion 61 and the fixed arm 60 are fitted to the fitting hole 53A, so that the ball 57 is engaged with the V-shaped groove 60A formed in the fixed arm 60. At this time, the extrusion operation portion 61 is in the state protruding from the side opposite to the insertion side of the fitting hole 53A. Therefore, by pushing the head of the extrusion operation portion 61, the lower rubber plug holder 37 can be easily removed.

The lower insertion guide 39 comprises: as shown in FIG. 7, an insertion guide block 63 provided with a guide barrel 62 in an arc shape in section, in a protruding condition, having a groove 62A on the upper face for ensuring the electric wire insertion path by being inserted into the barrel hole in the rubber plug 14; a fixed arm 64 integrally formed on the side of the insertion guide block 63; and an extrusion operation portion 65 integrally formed at the end of the fixed arm 64. Also, at a predetermined position of the fixed arm 64, there is formed a V-shaped groove 64A in the same manner as the lower rubber plug holder 37. Also in the lower insertion guide 39, when it is mourned in the fitting hole 54A of the lower movable block section 54, a ball (not shown) is engaged with the V-shaped groove 64A. Moreover, the extrusion operation portion 65 protrudes from the side opposite to the insertion side of the fitting hole 54A. Hence, at the time of replacing the lower insertion guide 39, it can be easily removed by pushing the extrusion operation portion 65. The lower holder support block 35 is set so as to allow movement of the extrusion operation portion 65 and expose the extrusion operation portion 65 so as to make it easy to push it.

The above-described upper holder support block 34 and the lower holder support block 35 can perform a movement of going close to or away from each other, and a movement moving in the back and forth direction of the rubber plug insertion apparatus 10, by means of a drive means (not shown). The upper and lower movable block sections 41, 54 can go close to or away from the upper and lower fixed block sections 40, 53, respectively, by means of a drive means (not shown).

Figure 3:
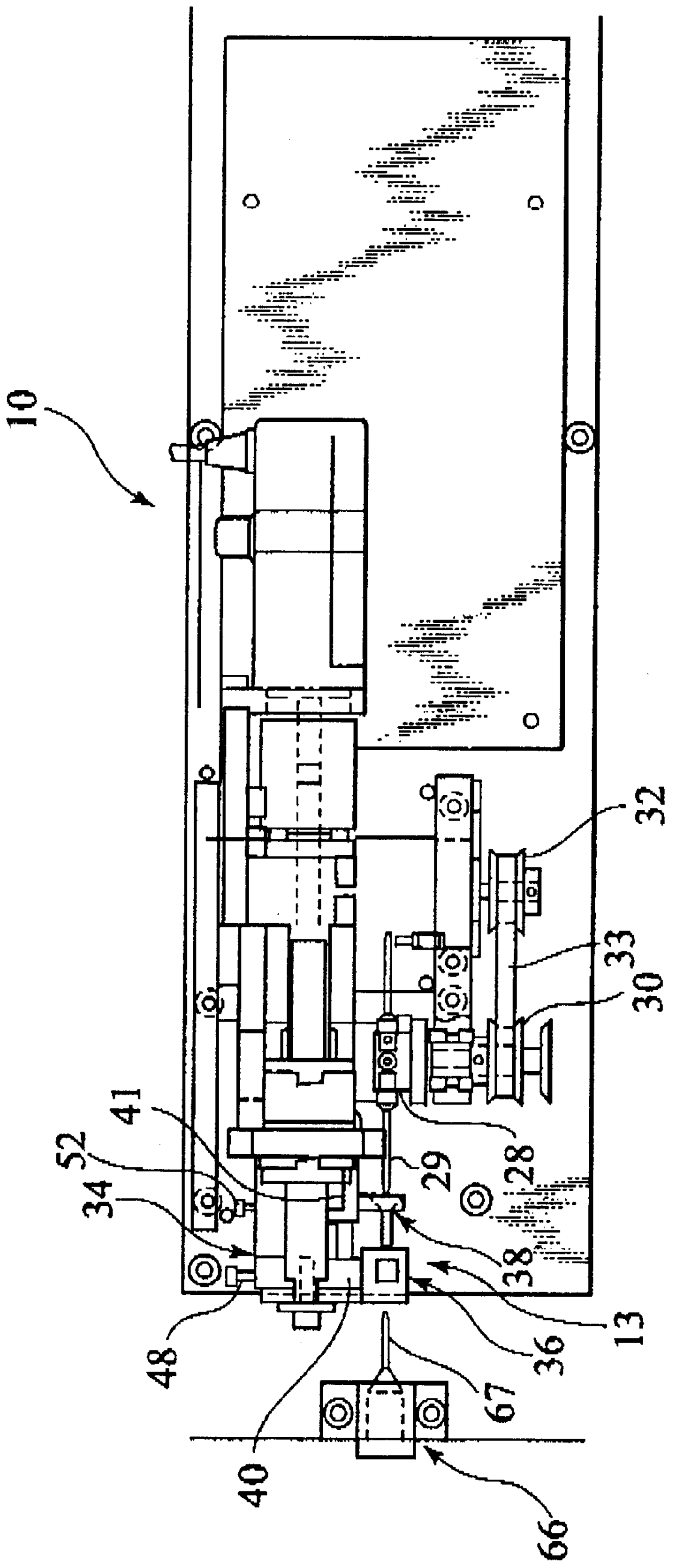
FIG. 3 is a plan view of the rubber plug insertion apparatus 10 in this embodiment.

At the rear of the rubber plug mounting section 13 (on the opposite side of the rotary transfer section 18), there is arranged a section 66 for holding the end of the electric wire, as shown in FIG. 3. The end of the electric wire 67 on which the rubber plug 14 is mounted is supplied and arranged each time, to the section 66 for holding the end of the electric wire.

As described above, the construction of the rubber plug insertion apparatus 10 in this embodiment has been described. Next the action and operation of the rubber plug insertion apparatus 10 will be described.

At first, the rubber plugs 14 in the housing drum 15 of the rubber plug supply section 11 are aligned on The alignment feeder 16 with the rotation and vibration of the housing drum 15, and are sent off sequentially to the rubber plug alignment extrusion section 17. Moreover, the rubber plugs 14 move along the alignment feeder 16, reach the rubber plug standby section 22 (see FIG. 6A) in the rubber plug alignment extrusion section 17, and are pushed out upwards by the escape pin 21 at a predetermined timing. At this time, the transfer pin 29 in the rotary transfer section 18 waits above the rubber plug standby section 22. Therefore, as a result of lifting of the rubber plug 14, the transfer pin 29 is inserted into the barrel hole in the rubber plug 14 and held therein (shown in FIGS. 5A, 5B).

Then, the rubber plug 14 is held on the transfer pin 29 facing downwards. Thereafter, the drive shaft 31 of the drive pulley 32 is rotated and moved at a predetermined angle of rotation, based on a drive signal output by a control unit (not shown). With the rotation of the drive shaft 31, the rotation is transmitted to the rotary block 28 via the endless belt 33 and the driven pulley 30, to thereby perform rotary motion through 90 degrees. By the rotary motion, the transfer pin 29 holding the rubber plug 14 approaches the rubber plug mounting section 13.

Figure 9:
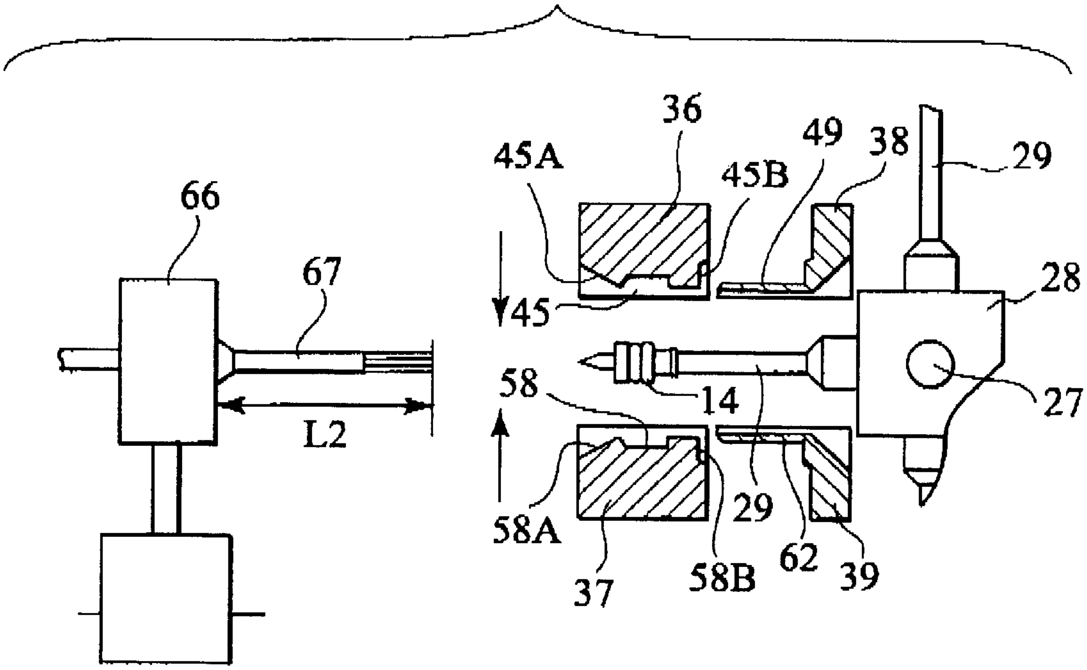
FIG. 9 is a partial sectional view showing a first step of mounting a rubber plug 14 on the end of an electric wire 67 in this embodiment.
Figure 10:
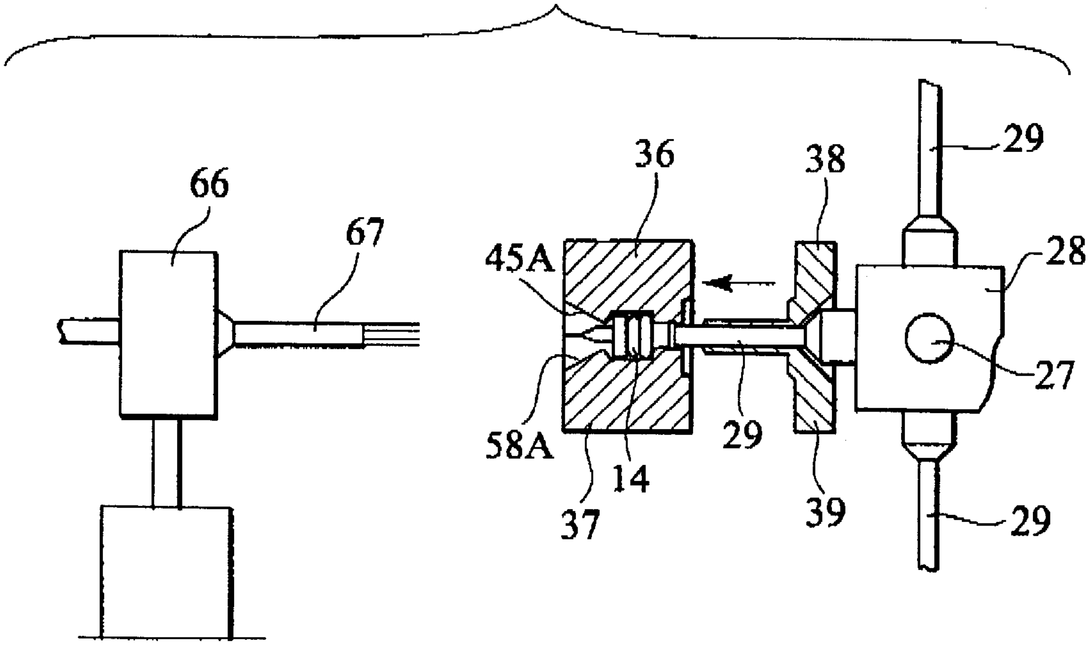
FIG. 10 is a partial sectional view showing the next step of FIG. 9 in this embodiment.
Figure 11:
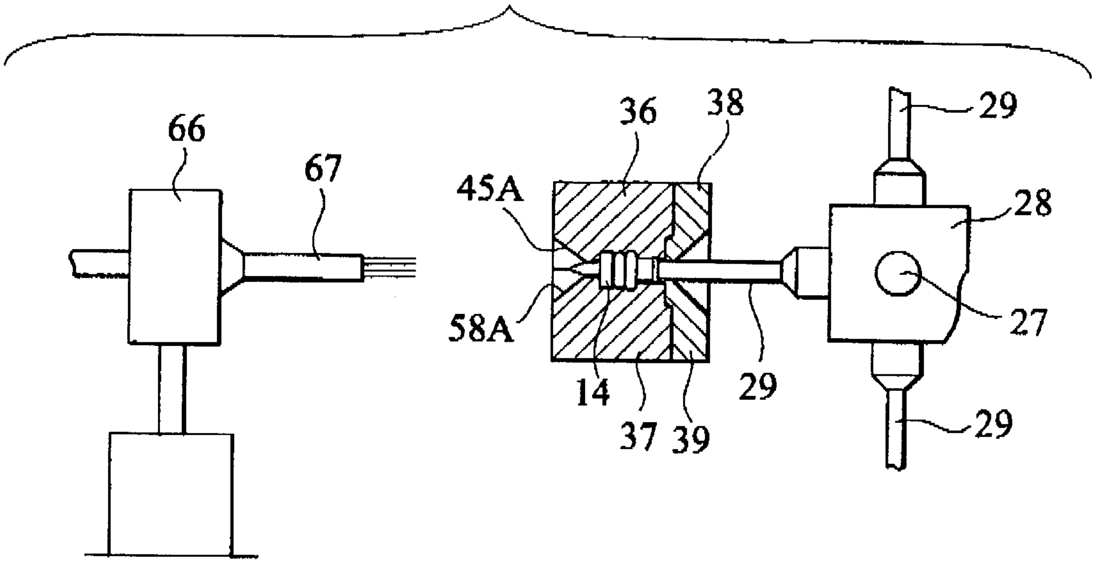
FIG. 11 is a partial sectional view showing the next step of FIG. 10 in this embodiment.
Figure 12:
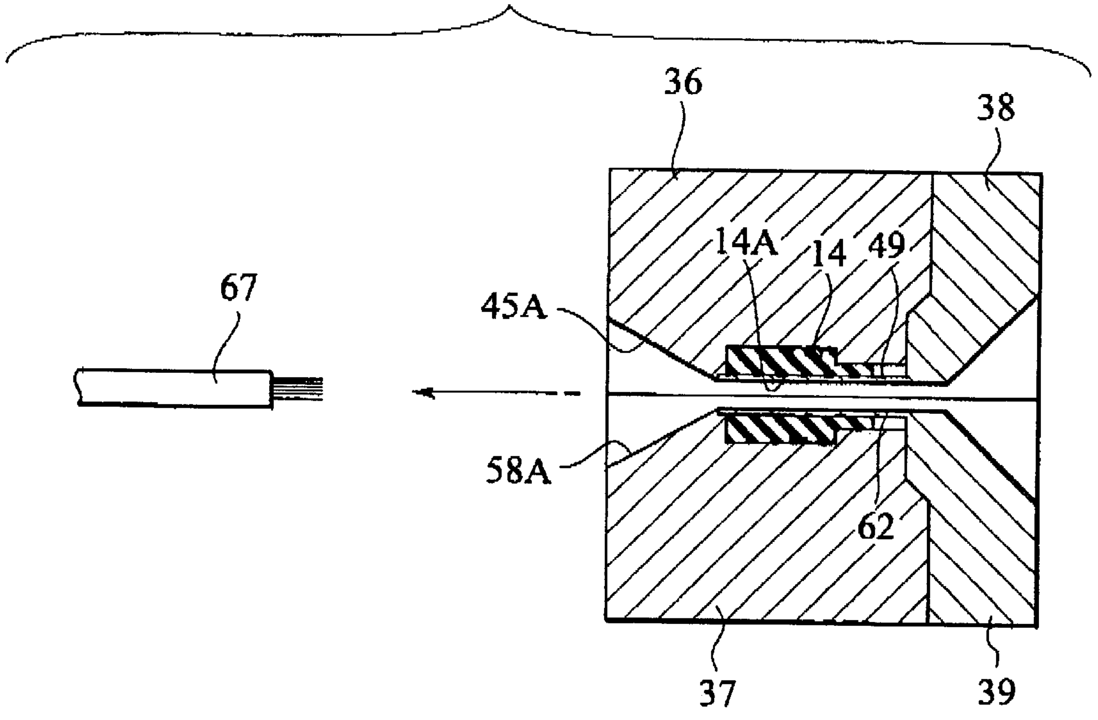
FIG. 12 is a partial sectional view showing the next step of FIG. 11 in this embodiment.

From this state, the rubber plug holders 36, 37 alienated up and down from each other move to the position corresponding to the upper and lower positions of the rubber plug 14 held by the transfer pin 29 (see FIG. 9), by means of a drive means (not shown). Thereafter, as shown in FIG. 10, the upper and lower holder support blocks 34, 35 are made to approach to each other, to enclose the rubber plug 14 with the rubber plug housing recess portions 45, 58 of the upper and lower rubber plug holders 36, 37 to thereby house and hold the rubber plug 14. Then, the upper and lower insertion guides 38, 39 are moved toward the upper and lower rubber plug holders 36, 37 (in the direction shown by arrow in FIG. 10), so that the guide barrel portions 49, 62 are inserted into the electric wire penetrating hole 14A of the rubber plug 14 (see FIG. 11). In this case, the upper and lower movable block sections 41, 54 are moved so as to approach the upper and lower fixed block sections 40, 53. At this time, the upper and lower insertion guides 38, 39 are joined together, as shown in FIG. 12, and the guide barrels 49, 62 constitute one pipe. The guide barrels 49, 62 in such a pipe shape are inserted into the barrel hole in the rubber plug 14, with the movement of the upper and lower movable block sections 41, 54, to thereby ensure the electric wire insertion space. While keeping this condition, the upper and lower holder support blocks 34, 35 are transferred rearwards (in the direction of pulling out the rubber plug 14 from the transfer pin 29), so that the rubber plug 14 can be separated from the transfer pin 29 (see FIG. 12).

Then, the rubber plug mounting section 13 holding the rubber plug 14 as described above and the section 66 for holding the end of the electric wire are made to approach to each other, so that the end of the electric wire 67 can be inserted into the electric wire penetrating hole 14A in the rubber plug 14 (see FIG. 13). Thereafter, as shown in FIG. 14, the guide barrels 49, 62 are pulled out to the side opposite to the side of inserting the electric wire into the rubber plug, from the electric wire penetrating hole 14A in the rubber plug 14, to thereby bring out the upper and lower insertions guides 38, 39 from the rubber plug holders 36, 37. Moreover, as shown in FIG. 15, the upper rubber plug holder 36 and the upper insertion guide 38 are moved upward, and at the same time, the lower rubber plug holder 37 and the lower insertion guide 39 are moved downward, to thereby complete mounting of the rubber plug 14. After the rubber plug 14 is mounted on the end of on electric wire 67 in this manner, an end of a new electric wire 67 is set in the section 66 for holding the end of the electric wire, to repeat the above steps. As a result, mounting of the rubber plug 14 can be efficiently performed continuously.

With the rubber plug insertion apparatus 10 in the above embodiment, since the upper and lower insertion guides 38, 39 are arranged on the side of the rubber plug holders 36, 37 opposite to the insertion side of the end of the electric wire 67, the position of holding the electric wire (the section 66 for holding the end of the electric wire) can be set in the vicinity of that end. That is to say, that side of pulling out the guide barrels 49, 62 of the upper and lower insertion guides 38, 39 from the upper and lower rubber plug holders 36, 37 is a side opposite to the insertion side of the end of the electric wire. Therefore, even if the vicinity of the end of the electric wire 67 is held, it does not interrupt the pulling out operation of the upper and lower insertion guides 38, 39, and the extension length of the electric wire (L2 shown in FIG. 9) from the holding position to the point of the end of the electric wire can be set short. Hence, bending of the end of the electric wire hardly occurs, enabling reliable insertion of the end of the electric wire 67 into the electric wire penetrating hole 14A in the rubber plug 14. As a result, a rubber plug in which defective insertion hardly occurs can be inserted in the wire harness. Moreover, by inserting guide barrels 49, 62 of the upper and lower insertion guides 38, 39 from the side opposite to the end of the electric wire 67, it can be prevented that insertion of the end of the electric wire 67 into the electric wire penetrating hole 14A becomes difficult, due to reasons, for example, the electric wire penetrating hole 14A in the rubber plug 14 is collapsed, or the like.

In this embodiment, it is easy to detach the upper and lower rubber plug holders 36, 37 and the upper and lower insertion guides 38, 39 from the upper and lower holder support blocks 34, 35. Therefore, for example, when the specification or kind of the rubber plug 14 is changed, it becomes possible to easily replace the upper and lower rubber plug holders 36, 37 and the upper and lower insertion guides 38, 39 with ones having a size suitable to that rubber plug 14 within a short period of time. As a result, it becomes possible to use the rubber plug insertion apparatus 10 to mount various kinds of rubber plugs without requiring a long time for the setup time. Moreover, the upper and lower rubber plug holders 36, 37 and the upper and lower insertion guides 38, 39 can be detached with one-touch operation by the ball plunger mechanism. As a result, any skill is not required for detachment, thereby enabling improvement in the workability.

One embodiment of the present invention has been described above, but the present invention is not limited thereto, and various modifications accompanying the aspect of the construction are possible. For example, in the above-described embodiment, the rubber plug supply section 11 has a construction comprising a housing drum 15 and an alignment feeder 16, however, other rubber plug supply means may be used. Moreover, in the above-described embodiment, in order to make it easy to detach the upper and lower rubber plug holders 36, 37 and the upper and lower insertion guides 38, 39, a ball plunger structure is used for attachment, however, the construction may be such that other fixation means are used for attachment.

What is claimed is:

1. A rubber plug insertion apparatus comprising:

a rubber plug holder by which a rubber plug having an electric wire penetrating hole to be mounted on an end of an electric wire is held, the rubber plug holder having an electric wire insertion side for receiving the end of the electric wire and a side opposite the electric wire insertion side; and an insertion guide for guiding the end of the electric wire into the electric wire penetrating hole while the rubber plug is located in the rubber plug holder, while the end of the electric wire is inserted into the electric wire penetrating hole, wherein the insertion guide is arranged on the side opposite the electric wire insertion side of the rubber plug holder.

2. The apparatus of claim 1, wherein the rubber plug holder comprises:

a holder body;

a holding groove for holding the rubber plug, the holding groove being provided in the holder body;

an opening for receiving the end of the electric wire, the opening being provided continuously on one side of the holding groove so as to expand gradually toward the electric wire insertion side of the plug holder; and an opening on the side opposite the electric wire insertion side provided on the other side of the holding groove for receiving the insertion guide, and wherein the insertion guide comprises:

a guide body; and a guide barrel that protrudes from the guide body, the guide barrel being configured to be inserted into the side opposite the electric wire insertion side and to be inserted into the electric wire penetrating hole when the rubber plug is positioned in the holding groove.

3. A rubber plug insertion method of inserting an end of an electric wire held by an electric wire holding section into a rubber plug having an electric wire penetrating hole, the end of the electric wire protruding from the electric wire holding section by a predetermined dimension, said method comprising:

housing and holding the rubber plug by positioning the rubber plug between upper and lower rubber plug holders arranged in proximity to the end of the electric wire, the rubber plug holders having an electric wire insertion side and a side opposite the electric wire insertion side;

inserting an insertion guide having a guide barrel into the rubber plug holders on the side opposite the electric wire insertion side;

such that the guide barrel is inserted into the electric wire penetrating hole in the rubber plug;

moving the rubber plug holders and the guide barrel toward the end of the electric wire;

inserting the end of the electric wire into the electric wire penetrating hole in the rubber plug in the rubber plug holders;

removing the insertion guide from the rubber plug, holders by pulling out the guide barrel of the insertion guide from the electric wire penetrating hole in the rubber plug toward the side opposite to the electric wire insertion side;

removing the rubber plug holders from the rubber plug; and removing the end of the electric wire and the rubber plug mounted thereon from the rubber plug holders.

* * * * *

UNITED STATES PATENT AND TRADEMARK OFFICE

CERTIFICATE OF CORRECTION

PATENT NO. : 6,671,954 B2
DATED : January 6, 2004
INVENTOR(S) : Yoshiaki Nomoto

It is certified that error appears in the above-identified patent and that said Letters Patent is hereby corrected as shown below:

Title page,
Item [57], ABSTRACT,
Line 8, "36, 37, By" should read -- 36, 37. By --.

Column 11,
Line 4, "the plug" should read -- the rubber plug --.

Signed and Sealed this

Eighth Day of June, 2004

JON W. DUDAS
*Acting Director of the United States Patent and Trademark Office*